United States Patent [19]

Schwindt et al.

[11] 4,263,423
[45] Apr. 21, 1981

[54] PROCESS FOR THE PREPARATION OF POLYURETHANE CASTING ELASTOMERS

[75] Inventors: Jürgen Schwindt, Leverkusen; Holger Meyborg, Odenthal; Gerhard Grögler, Leverkusen; Klaus Recker, Cologne, all of Fed. Rep. of Germany

[73] Assignee: Bayer Aktiengesellschaft, Leverkusen, Fed. Rep. of Germany

[21] Appl. No.: 57,936

[22] Filed: Jul. 16, 1979

[30] Foreign Application Priority Data

Jul. 22, 1978 [DE] Fed. Rep. of Germany ....... 2832315

[51] Int. Cl.$^3$ .................. C08G 18/22; C08G 18/24; C08G 18/26; C08G 18/16
[52] U.S. Cl. ...................................... 528/55; 521/121; 521/124; 521/125; 521/126; 528/56; 528/57; 528/58
[58] Field of Search .................. 521/121, 125; 528/56, 528/57

[56] References Cited

U.S. PATENT DOCUMENTS

| | | | |
|---|---|---|---|
| 2,897,181 | 7/1959 | Windemuth | 528/56 |
| 3,108,975 | 10/1963 | Lambert et al. | 521/125 |
| 3,516,950 | 6/1970 | Haggis | 521/125 |
| 3,645,927 | 2/1972 | Andres et al. | 521/121 |
| 3,892,715 | 7/1975 | Bonin et al. | 260/77.5 AB |
| 3,945,981 | 3/1976 | Robertson | 260/75 NB |
| 3,975,317 | 8/1976 | Russo | 521/51 |
| 4,067,832 | 1/1978 | Des Marais | 260/2.5 AB |
| 4,101,471 | 7/1978 | Russo | 521/121 |

FOREIGN PATENT DOCUMENTS 1745418 9/1971 Fed. Rep. of Germany .
1182014 2/1970 United Kingdom .

OTHER PUBLICATIONS

D.A.S. 1,745,418, San-Abatt (Hashinoto et al.) Sept. 9, 1971

Primary Examiner—H. S. Cockeram
Attorney, Agent, or Firm—Gene Harsh; Joseph C. Gil; Lyndanne M. Whalen

[57] ABSTRACT

The instant invention is directed to a process for the production of a light fast, transparent polyurethane elastomer comprising reacting:
(A) from 90 to 50% by weight, based on the polyurethane solids content, of a compound having a molecular weight of from 400 to 10,000 which has at least two Zerewitinoff active hydrogen atoms;
(B) from 50 to 10% by weight, based on the polyurethane solids content, of an aliphatic and/or alicyclic polyisocyanate; and
(C) from 0 to 20% by weight, based on the polyurethane solids content, of a chain-lengthening agent having a molecular weight of from 60 to 400; in the presence of:
(D) catalysts for the isocyanate polyaddition reaction, the improvement wherein said catalysts, component (D), is a catalyst combination of:
 (a) an alkali metal hydroxide and/or alkaline earth metal hydroxide; and
 (b) an organometallic compound selected from the group consisting of the acetyl acetonate of iron, $C_1$–$C_8$ alcoholates, phenolates, enolates and/or acetyl acetonates of metals of the 4th main group or sulfur-containing compounds of metals of the 4th main group, in which compounds the sulfur is directly attached to the metal atom.

6 Claims, No Drawings

PROCESS FOR THE PREPARATION OF POLYURETHANE CASTING ELASTOMERS

BACKGROUND OF THE INVENTION

This invention relates to a process for the production of light fast, transparent casting elastomers using novel catalyst combinations. The polyurethanes produced according to the present invention may be used for various purposes, e.g. as coating or sealing compounds, in packaging foils or in the bio-medical field.

It is known that polyurethane systems based on aromatic diisocyanates (e.g. tolylene diisocyanate, diisocyanatodiphenyl methane, etc.) undergo severe yellowing under prolonged exposure to light, even if they have been light stabilized, and therefore do not fulfill the requirements for the areas of usage mentioned above. It is also known that polyurethanes which are based on aliphatic or alicyclic polyisocyanates, in particular polyurethane lacquers of this type, generally do not show such a tendency to yellowing.

Using aliphatic or alicyclic polyisocyanates for the production of light fast transparent polyurethane elastomers has hitherto failed to be used commercially because of the severe cloudiness which occurs in the course of the polyaddition reaction, the inadequate heat resistance and the inferior mechanical properties of the elastomers.

In German Auslegeschrift No. 1,745,418 there is described a process for the production of cellular or noncellular molded polyurethane articles based on aromatic or aliphatic polyisocyanates in which the catalysts used for the polyisocyanate polyaddition reaction are diazabicyclo compounds, e.g. 1-8-diazabicyclo-(5,4,0)-undecene or its ammonium salts, optionally in combination with organo-metallic compounds, such as dibutyl tin dilaurate.

The use of such catalysts or catalyst combinations or of other catalysts, such as diazabicyclo-(2,2,2)-octane, for the production of molded polyurethane articles based on aliphatic or alicyclic polyisocyanates does not improve the heat resistance or mechanical properties of the elastomers and also results in cloudy products permeated with bubbles. The formation of bubbles may only be prevented by using very high catalyst concentrations (with a drastic reduction in the pot-life of the polyurethane mixtures which makes normal processing impossible). However, the use of high catalyst concentrations cause discoloration, as well as catalyzing the back reaction.

It was therefore an object of the present invention to provide a new process by which it would be possible to produce light fast, transparent elastomers based on aliphatic or alicyclic polyurethanes which would not have the disadvantages of cloudiness, formation of bubbles and low heat resistance and which could be cured in the heat or cold and processed under suitable conditions (sufficiently long pot-life and short molding time).

It has now surprisingly been found that the disadvantages mentioned above could be obviated and elastomers having excellent mechanical properties could be obtained in an operating cycle suitable for practical purposes if particular catalyst combinations were used.

DESCRIPTION OF THE INVENTION

The present invention relates to a process for the production of light fast, transparent polyurethane elastomers comprising reacting:

(A) from 90 to 50% by weight, based on the polyurethane solids content, of a compound having a number average molecular weight of from 400 to 10,000, as determined by gel permeation chromatography, having at least two Zerewitinoff active hydrogen atoms;

(B) from 50 to 10% by weight, based on the polyurethane solids content, of an aliphatic and/or alicyclic polyisocyanate;

(C) from 0 to 20% by weight, based on the polyurethane solids content, of a chain-lengthening agent having a number average molecular weight of from 60 to 400, as determined by gel permeation chromatography; in the presence of (D) catalysts for the isocyanate polyaddition reaction; the improvement wherein said component (D) is a catalyst combination of:

(a) an alkali metal and/or alkaline earth metal hydroxide, in particular a lithium, sodium, potassium, magnesium and/or calcium hydroxide; and (b) an organic metal compound selected from the group consisting of the acetyl acetonate of iron, $C_1$-$C_8$ alcoholates, phenolates, enolates and/or acetyl acetonates of metals of the 4th main group or compounds of metals of the 4th main group containing sulfur in which the sulfur is directly attached to the metal atom and in which the organic groups are preferably at least in part attached to the metal atom through sulfur atoms.

Suitable for the purposes of the present invention are those organo-metallic compounds which are compatible with the alkali metal or alkaline earth metal hydroxides, i.e. which maintain the catalytic activity thereof during the polyaddition reaction and are not attacked hydrolytically to any significant extent by the powerful basic hydroxides under the reaction conditions. Examples of such compounds include: the acetyl acetonates of Fe, Sn and Pb, e.g. dibutyl tin-(IV) diacetyl acetonate, and phenolates, elonates and $C_1$-$C_8$ alcoholates of Sn(IV) and Pb. The Sn(II) and Sn(IV) carboxylates commonly used in polyurethane chemistry, such as Sn(II) octoate and dibutyl tin dilaurate, are not suitable for the process according to the present invention.

The sulfur-containing catalysts used are preferably compounds of the formulae:

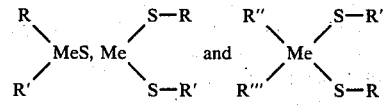

wherein

Me represents tin or lead, preferably tin; and

R, R', R" and R''' which may be the same or different, each represents a straight- or branched-chain alkyl group having from 1 to 20 carbon atoms, preferably from 4 to 12 carbon atoms, or a cycloalkyl group having from 6 to 15 carbon atoms which may be substituted by $C_1$-$C_4$ alkyl groups or a phenyl group which may be substituted by $C_1$-$C_4$ alkyl groups or by halogen.

Particularly preferred are compounds corresponding to the following general formula:

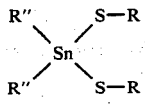

wherein

R represents a straight- or branched-chain alkyl group having from 8 to 12 carbon atoms; and R" represents a straight- or branched-chain alkyl group having from 4 to 8 carbon atoms.

The following are mentioned as examples of suitable catalysts containing sulfur: dibutyl tin (IV)-sulfide, dioctyl tin (IV)-sulfide, dibutyl tin (IV)-bis-dodecyl mercaptide, dioctyl tin (IV)-bis-dodecyl mercaptide and tin (II)-bis-(2-ethylhexyl mercaptide). According to the present invention, it is particularly preferred to use dibutyl tin (IV)-bis-dodecyl mercaptide.

The catalyst combinations according to the present invention are normally used in quantities of from 0.005 to 4% by weight, preferably from 0.01 to 0.8% by weight, based on the polyurethane solids content. The molar ratio of alkali metal and/or alkaline earth metal hydroxide to organic metal compound should be from 3:1 to 1:6, preferably from 1.5:1 to 1:3. The alkali metal and/or alkaline earth metal hydroxide should preferably be in the form of a from 1 to 20%, most preferably from 5 to 15%, solution in a low molecular weight polyol. These catalyst combinations may be added to the reaction mixture either separately as individual components or as a mixture of components.

The aliphatic or cycloaliphatic polyisocyanate, component (B), used in the process according to the present invention preferably consists of isocyanate group-containing prepolymers or solutions of the prepolymers in monomeric aliphatic or cycloaliphatic diisocyanates (so-called "semi-prepolymers"). The prepolymers or semi-prepolymers generally have an average isocyanate content of from 14 to 28% by weight. These may be obtained by the reaction of any monomeric aliphatic or cycloaliphatic diisocyanates with the relatively high molecular and/or low molecular polyhydroxyl compounds described in more detail below which are commonly used in polyurethane chemistry and preferably contain aliphatically bound hydroxyl groups. This reaction is generally carried out using an NCO/OH equivalent ratio of from 1.5:1 to 5:1, preferably from 2.2:1 to 3:1, most preferably ca. 2.5:1.

Monomeric diisocyanates suitable for the purposes of the present invention have been described, for example, by W. Siefken in Justus Liebig's Annalen der Chemie, 562, pages 75 to 136. The following are examples: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,5,5-trimethyl-5-isocyanatomethyl cyclohexane (German Auslegeschrift No. 1,202,785 or U.S. Pat. No. 3,401,190); 2,4- and 2,6-hexahydrotolylene diisocyanate and mixtures of these isomers; hexahydro-1,3- and/or -1,4-phenylene diisocyanate and perhydro-2,4'- and/or -4,4'-diphenyl methane-diisocyanate. It is particularly preferred according to the present invention to use hexamethylene diisocyanate and 1-isocyanato-3,3,5-trimethyl-5-isocyanatomethyl-cyclohexane (isophorone diisocyanate).

The aliphatic and alicyclic polyisocyanates commonly used in polyurethane chemistry which contain carbodiimide, allophanate, isocyanurate, biuret and/or acylated urea groups are also suitable.

Compounds used as component (A) in the process according to the present invention or for synthesizing the prepolymers or semi-prepolymers contain at least two isocyanate-reactive hydrogen atoms and generally have a molecular weight of from 400 to 10,000. These may be compounds containing amino groups or thiol groups, but are preferably polyhydroxyl compounds. The polyhydroxyl compounds preferably have from 2 to 8 aliphatically bound hydroxyl groups and have a molecular weight of from 800 to 6,000, preferably from 1,000 to 4,000. Examples include polyesters, polyethers, polythioethers and polycarbonates having at least two, generally from 2 to 8, preferably from 2 to 4, hydroxyl groups, such as the compounds of this type used for the production of non-cellular and cellular polyurethanes, or mixtures of such compounds. Polyesters, polycarbonates, and alkoxylation productions of 4,4'-dihydroxydiphenyl propane (bisphenol A) are preferred according to the present invention.

The polyesters containing hydroxyl groups which may be used according to the present invention include, e.g. reaction products of polyhydric (preferably dihydric) alcohols with the optional addition of trihydric alcohols, and polybasic (preferably dibasic) carboxylic acids. Instead of free polycarboxylic acids, the corresponding polycarboxylic acid anhydrides or polycarboxylic acid esters of lower alcohols or mixtures thereof may be used for the preparation of the polyesters. The polycarboxylic acids may be aliphatic, cycloaliphatic, aromatic and/or heterocyclic and they may be substituted, e.g. by halogen atoms, and/or may be unsaturated.

The following are examples of such carboxylic acids and derivatives thereof: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids, optionally mixed with monomeric unsaturated fatty acids, such as oleic acid; dimethyl terephthalate and terephthalic acid-bis-glycol esters. Examples of suitable polyhydric alcohols include: ethylene glycol, propylene glycol (1,2) and -(1,3), butylene glycol-(1,4) and -(2,3), hexane diol-(1,6), octane diol-(1,8), neopentyl glycol, 1,4-bis-hydroxymethyl cyclohexane, 2-methyl-1,3-propanediol, glycerol, trimethylol propane, hexane triol-(1,2,6), butane triol-(1,2,4), trimethylol ethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols. The polyesters may contain a proportion of carboxyl end groups. Polyesters of lactones, such as ε-caprolactone, or of hydroxycarboxylic acids, such as ω-hydroxycaproic acid, may also be used.

It is preferred according to the present invention to use polyesters based on aliphatic carboxylic acids (in particular adipic acid) and aliphatic diols having from 2 to 6 carbon atoms and/or bisphenol A.

The polyethers used according to the present invention, which have at least two, preferably 2 or 3, hydroxyl groups, are also known. They may be prepared by the polymerization of cyclic ethers (such as tetrahydrofuran) either on their own, e.g. in the presence of BF$_3$, or by an addition reaction of epoxides (such as ethylene oxide, propylene oxide, butylene oxide, styrene oxide or epichlorohydrin) optionally as mixtures or successively, with starting components which have reactive hydrogen atoms (such as 4,4'-dihydroxydiphenyl propane). According to the present invention, however, these polyethers are preferably not used alone, but in combination with a polyester polyol or a polycarbonate polyol.

The hydroxyl polycarbonates used may be of known type, e.g. the compounds obtained by the reaction of diols with diaryl carbonates, such as diphenyl carbonate, or with phosgene (German Auslegeschriften Nos. 1,694,080; 1,915,908 and 2,221,751; German Offenlegungsschrift No. 2,605,024). Examples of diols which may be used include propane diol-(1,3), butane diol-(1,4) and/or hexane diol-(1,6), diethylene glycol, triethylene glycol, tetraethylene glycol or thiodiglycol.

The polyhydroxyl compounds mentioned above may also be modified in various ways before they are used in the polyisocyanate polyaddition process. According to German Offenlegungsschrift No. 2,210,839 (U.S. Pat. No. 3,849,515) and 2,544,195, a mixture of various polyhydroxyl compounds (e.g. of a polyether polyol and a polyester polyol) may be condensed by etherification in the presence of a strong acid to produce a higher molecular weight polyol consisting of different segments connected through ether bridges. Furthermore, amide groups may be introduced into the polyhydroxyl compounds (according to German Offenlegungsschrift No. 2,559,372) or triazine groups may be introduced by a reaction with polyfunctional cyanic acid esters (German Offenlegungsschrift No. 2,620,487).

Representatives of the aforesaid compounds to be used according to the present invention have been described in High Polymers, Vol. XVI, "Polyurethanes, Chemistry and Technology" by Saunders Frisch, Interscience Publishers, New York, London, Vol. I, 1962, pages 32 to 42 and pages 44 to 54 and Vol. II, 1964, pages 5–6 and 198–199, and in Kunststoff Handbuch, Vol. VII, Vieweg Huml/o chtlen, Carl Hanser Verlag, Munich 1966, e.g. on pages 45–71. There may also be used mixtures of the above-mentioned compounds which have at least two isocyanate-reactive hydrogen atoms and have a molecular weight of from 400 to 10,000, e.g. mixtures of polyethers and polyesters.

In some cases it is particularly advantageous to use a combination of low melting and high melting polyhydroxyl compounds (German Offenlegungsschrift No. 2,706,297).

Compounds having a molecular weight of from 60 to 400, in particular from 90 to 300, which have at least two isocyanate-reactive hydrogen atoms are used as optional starting components (C) in the process according to the present invention and for synthesizing the isocyanate prepolymers and semi-prepolymers. These also are compounds containing hydroxyl groups and/or thiol groups and/or carboxyl groups, preferably hydroxyl groups. They serve as chain-lengthening agents or cross-linking agents. They generally have from 2 to 8 isocyanate-reactive hydrogen atoms, preferably 2 or 3 such reactive hydrogen atoms.

Here again, there may be used mixtures of different compounds which have a molecular weight of from 60 to 400, in particular from 90 to 300, and contain at least two isocyanate-reactive hydrogen atoms.

The following are examples of such compounds: ethylene glycol, propylene glycol-(1,2) and -(1,3); butylene glycol-(1,4) and -(2,3); pentane diol-(1,5); hexane diol-(1,6); octane diol-(1,8); neopentyl glycol; 1,4-bis-hydroxymethyl-cyclohexane; 2-methyl-1,3-propanediol; dibromobutene diol (U.S. Pat. No. 3,723,392); glycerol; trimethylolpropane; hexane triol-(1,2,6); trimethylol ethane; pentaerythritol; quinitol; mannitol; sorbitol; castor oil; diethylene glycol; triethylene glycol; tetraethylene glycol; higher propylene glycols having a molecular weight of up to 400; dipropylene glycol, higher polypropylene glycols having a molecular weight of up to 400; dibutylene glycol; higher polybutylene glycols having a molecular weight of up to 400; 4,4'-dihydroxydiphenylpropane; di-hydroxymethyl-hydroquinone; 1,4-phenylene-bis-($\beta$-hydroxyethylether); hydrazinoethanols; ester diols corresponding to the following general formulae:

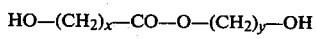

and

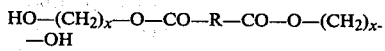

wherein

R represents an alkylene group having from 1 to 10, preferably from 2 to 6 carbon atoms or a cycloalkylene or arylene group having from 6 to 10 carbon atoms;

x represents a number of from 2 to 6; and y represents a number of from 3 to 5;

e.g. $\delta$-hydroxybutyl-$\epsilon$-hydroxy-caproic acid ester; $\omega$-hydroxyhexyl-$\gamma$-hydroxybutyric acid ester; adipic acid-bis-($\beta$-hydroxyethyl)-ester and terephthalic acid-bis-($\beta$-hydroxyethyl)-ester.

Diol urethanes corresponding to the following general formula may be used:

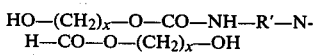

wherein

R' represents an alkylene group having from 2 to 15, preferably from 2 to 6, carbon atoms or a cycloalkylene or arylene group having from 6 to 15 carbon atoms; and x represents a number of from 2 to 6;

e.g. 1,6-hexamethylene-bis-($\beta$-hydroxyethylurethane) or 4,4'-diphenylmethane-bis-($\delta$-hydroxybutylurethane).

Diol ureas corresponding to the following general formula may be used:

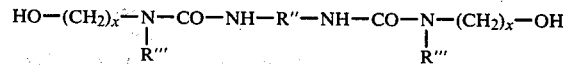

wherein

R'' represents an alkylene group having from 2 to 15, preferably from 2 to 9 carbon atoms or a cycloalkylene or arylene group having from 6 to 15 carbon atoms;

R''' represents hydrogen or a methyl group; and x represents 2 or 3;

e.g. 4,4'-diphenylmethane-bis-($\beta$-hydroxyethyl urea) or the compound:

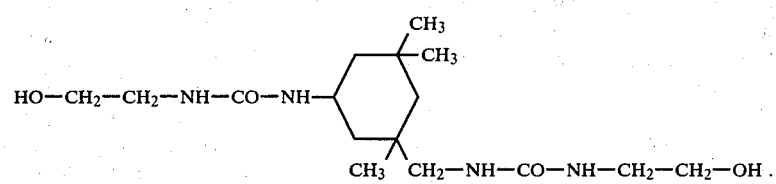

The chain-lengthening agents used according to the present invention may also be compounds, such as 1-mercapto-3-amino-propane or substituted or unsubstituted amino acids, such as glycine, alanine, valine, serine or lysine.

Compounds which are mono-functional in the reaction thereof with isocyanates may also be used in proportions of from 0.01 to 10% by weight, based on the polyurethane solids content, to serve as so-called "chain-terminators". Examples of such mono-functional compounds include: monohydric alcohols, such as butanol, 2-ethylhexanol, octanol, dodecanol, the various amyl alcohols, cyclohexanol, ethylene glycol monomethyl ethers etc.

An index of from 80 to 150, preferably from 90 to 120 (i.e. an equivalent ratio of isocyanate groups to hydroxyl groups of from about 0.8:1 to 1.5:1, preferably from 0.9:1 to 1.2:1) is generally observed in the production of the light fast, transparent polyurethane elastomers.

Production of the polyurethane resins may be carried out by, for example, mixing the above-described components in one or more stages in an intermittently or continuously operating mixing apparatus and leaving the resulting mixture to react (usually outside the mixing apparatus) in molds or on suitable supports. The preferred NCO:OH range is from 0.7:1 to 1.2:1. The catalysts to be used according to the present invention are generally added together with components (A) and/or (C), preferably, as mentioned above, in the form of a solution in chain-lengthening agent (C). The two catalyst components may be introduced into the reaction mixture either separately or as a preliminary mixture.

The processing temperatures employed may be from 10° to 150° C., but are preferably from 20° to 75° C. In one particularly preferred method, the components are added together at room temperature and then cured by heating at from 100° to 110° C. for 10 minutes or left to harden at room temperature.

The mixture of components may also be pressed, cast or extruded into cold or heated molds, which may be either relief molds or solid or hollow molds. They may then be left to harden in these molds. This may be accomplished optionally by a process of centrifugal casting at room temperature. The polyurethanes produced according to the present invention may be used as coating materials for polyvinyl chloride foils or boards or for glass or metal, as interlayers for composite glass, as foils for packaging materials and in the bio-medical field, e.g. as containers for preserved blood or for catheters or for infusion materials for the hollow fibers of artificial kidneys.

The following examples serve to explain the process according to the present invention for the production of light fast, transparent casting elastomers. The quantities given are to be understood as parts by weight, or percentages by weight, unless otherwise indicated.

EXAMPLES

EXAMPLE 1 (Comparison)

A mixture of 10 parts of butane diol-(1,4) and 100 parts of a polyester polyol having an average molecular weight of 2,000 (OH number 56) of adipic acid, ethylene glycol and butane diol is mixed for 30 seconds at room temperature with 0.3 parts of copper oleate and 96.6 parts of a prepolymer of hexamethylene diisocyanate and dipropylene glycol which has an isocyanate content of 15.2% (equivalent ratio NCO:OH=1.1:1). The mixture obtained is poured into a mold which has been preheated to 90° C. The reactive mixture remains in a pourable state for 14 minutes at room temperature. The cast object may be removed from its mold after 2 minutes. It shows severe cloudiness and formation of bubbles and softens at from 90° to 100° C. After a tempering time of 24 hours at 80° C., it is found to have the following mechanical properties:

| | | |
|---|---|---|
| Tensile strength | (DIN 53 504) | 2.8 MPa |
| Elongation at break | (DIN 53 504) | 785% |
| Tear propagation resistance | (DIN 53 515) | 10 KN/m |
| Shore hardness A | (DIN 53 505) | 48 |

EXAMPLE 2 (Comparison)

Example 1 is repeated, but using 0.3 parts of dibutyl tin dilaurate as catalyst instead of copper oleate. The reaction mixture remains in a pourable state for 10 minutes at room temperature. The cast object may be removed from its mold after 1.5 minutes. It shows severe cloudiness and formation of bubbles and softens at from 90° to 100° C.

After a tempering time of 24 hours at 80° C., it is found to have the following mechanical properties:

| | |
|---|---|
| Tensile strength | 6.9 MPa |
| Elongation at break | 12.5 KN/m |
| Shore hardness A | 52 |

EXAMPLE 3 (Comparison)

Example 1 is repeated, but using 0.3 parts of iron acetyl acetonate as catalyst. The reaction mixture remains in a pourable state for 20 minutes at room temperature. The cast object may be removed from its mold after 10 minutes. It shows very severe formation of bubbles and softens at from 90° to 100° C.

After a tempering time of 24 hours at 80° C., it is found to have the following mechanical properties:

| | |
|---|---|
| Tensile strength | 2.7 MPa |
| Elongation at break | 804% |
| Tear propagation resistance | 11.2 KN/m |

| | |
|---|---|
| -continued | |
| Shore hardness A | 50 |

EXAMPLE 4 (Comparison)

149 parts of the prepolymer described in Example 1 and 0.06 parts of a catalyst mixture of triethylene diamine and dibutyl tin dilaurate (molar ratio 1:1) are added to a mixture of 20 parts of butane diol-(1,4) and 100 parts of the polyester polyol from Example 1 at room temperature and the components are vigorously mixed for 30 seconds and then poured into a mold which has been preheated to 90° C. The reactive mixture remains in a pourable state for 10 minutes at room temperature. The cast object may be removed from the mold after 3.5 minutes. It is cloudy and permeated by numerous bubbles and softens at from 100° to 110° C.

After a tempering time of 24 hours at 90° C., it is found to have the following mechanical properties:

| | |
|---|---|
| Tensile strength | 19.7 MPa |
| Elongation at break | 520% |
| Tear propagation resistance | 35 KN/m |
| Shore hardness A | 89 |

EXAMPLE 5 (Comparison)

Example 4 is repeated using 0.3 parts of the catalyst mixture used in Example 4. The time taken to stir the catalyst mixture into the other reactants is 15 seconds and the casting time 20 seconds. The cast object may be removed from its mold after 1 minute. The product obtained is a transparent elastomer permeated with bubbles.

After a tempering time of 24 hours at 110° C., the elastomer has the following mechanical properties:

| | |
|---|---|
| Tensile strength | 28.5 MPa |
| Elongation at break | 529% |
| Tear propagation resistance | 48 KN/m |
| Shore hardness A | 90 |

EXAMPLE 6 (Comparison)

Example 4 is repeated, but the catalyst used consists of 0.1 parts of a combination of 1,8-diazabicyclo-(5,4,0)-undecene-7 and dibutyl tin dilaurate (molar ratio 1:1). The method is analogous to that of Example 1. The cast object shows slight cloudiness and severe bubbling.

| | |
|---|---|
| Tensile strength | 18.5 MPa |
| Elongation at break | 522% |
| Tear propagation resistance | 40.3 KN/m |
| Shore hardness A | 92 |

EXAMPLE 7

Example 4 is repeated, but as catalyst there are used 0.11 parts of a combination of 0.05 parts of a 10% solution of potassium hydroxide in butane diol-(1,4) and 0.06 parts of dibutyl tin-bis-(dodecyl mercaptide). The reaction mixture remains in a pourable state for 8 minutes at room temperature. The cast object, which may be removed from its mold after 5.5 minutes, is transparent and free from bubbles. After a tempering time of 24 hours at 110° C., the following mechanical data are obtained:

| | |
|---|---|
| Tensile strength | 31.7 MPa |
| Elongation at break | 512% |
| Tear propagation resistance | 55 KN/m |
| Shore hardness A | 91 |

EXAMPLE 8

Example 4 is repeated using 0.22 parts of the catalyst combination used in Example 7. The reaction mixture remains pourable for 6 minutes at room temperature. The cast object, which may be removed from the mold after 5 minutes, is transparent and free from bubbles.

After a tempering time of 24 hours at 110° C., it is found to have the following mechanical properties:

| | |
|---|---|
| Tensile strength | 31.5 MPa |
| Elongation at break | 522% |
| Tear propagation resistance | 55 KN/m |
| Shore hardness A | 91 |

EXAMPLE 9

Example 1 is repeated using 0.11 parts of the catalyst combination used in Example 7. The reaction mixture remains pourable at room temperature for 9.5 minutes. The cast object, which may be removed from the mold after 6 minutes, is transparent and free from bubbles.

| | |
|---|---|
| Mechanical data: | |
| Tensile strength | 25.3 MPa |
| Elongation at break | 538% |
| Tear propagation resistance | 43 KN/m |
| Shore hardness A | 82 |

EXAMPLE 10

Example 4 is repeated using a catalyst combination of 0.05 parts of a 10% sodium hydroxide solution in butane diol-(1,4) and 0.06 parts of dibutyl tin-bis-(dodecyl mercaptide). The reaction mixture remains pourable for 8.5 minutes at room temperature. The cast object, which may be removed from its mold after 5 minutes, is transparent and free from bubbles.

| | |
|---|---|
| Mechanical data: | |
| Tensile strength | 30.2 MPa |
| Elongation at break | 547% |
| Tear propagation resistance | 48 KN/m |
| Shore hardness A | 89 |

EXAMPLE 11

A mixture of 15 parts of butane diol and 80 parts of the polyester diol described in Example 1 is vigorously mixed at room temperature for 45 seconds with 0.11 parts of the catalyst combination used in Example 7 and 111.6 parts of the isocyanate prepolymer used in Example 1 (NCO:OH=1:1). The reactive mixture remains pourable for 4.5 minutes at room temperature. The cast object, which may be removed from the mold after 4 minutes at 100° C., is transparent and free from bubbles.

| Mechanical data: | |
| --- | --- |
| Tensile strength | 27.6 MPa |
| Elongation at break | 517% |
| Tear propagation resistance | 53.4 KN/m |
| Shore hardness A | 93 |

EXAMPLE 12

Example 11 is repeated, using a catalyst combination of 0.05 parts of a 10% sodium hydroxide solution in 1,4-butane diol and 0.5 parts of a 1% iron acetyl acetonate solution in dipropylene glycol. The reactive mixture remains pourable for 10 minute at room temperature. The cast object, which may be removed from its mold after 10 minutes, is transparent and free from bubbles. Its Shore hardness A is 96.

EXAMPLE 13

10 parts of butane diol-(1,4), 5 parts of tripropylene glycol and 80 parts of the polyester diol described in Example 1 are vigorously mixed for 45 seconds at room temperature with 0.11 parts of the catalyst combination described in Example 7 and 65.15 parts of the isocyanate prepolymer used in Example 1 (NCO:OH=1:1). The reactive mixture remains pourable for 2.5 minutes at 50° C. The cast object, which may be removed from its mold after 4.5 minutes, is transparent and free from bubbles.

| Mechanical data: | |
| --- | --- |
| Tensile strength | 33.9 MPa |
| Elongation at break | 481% |
| Tear propagation resistance | 49.5 KN/m |
| Shore hardness A | 94 |

EXAMPLE 14

Example 13 is repeated using 0.11 parts of the catalyst combination used in Example 10. A transparent, bubble free elastomer is obtained which has a Shore hardness A of 93.

EXAMPLE 15

15 parts of butane diol-(1,4), 5 parts of trimethylol propane, 5.5 parts of a polyether diol having an average molecular weight of 552 (OH number 203) obtained from 4,4'-dihydroxy diphenyl propane and ethylene oxide, and 60 parts of the polyester diol used in Example 1 are vigorously mixed for 1.5 minutes at room temperature with 0.11 parts of the catalyst combination described in Example 7 and 140.2 parts of the prepolymer used in Example 1 (NCO:OH=1:1). The reaction mixture remains pourable for 7 minutes at room temperature. The cast object, which may be removed from its mold after 5 minutes at 100° C., is transparent and free from bubbles.

| Mechanical data: | |
| --- | --- |
| Tensile strength | 32.6 MPa |
| Elongation at break | 511% |
| Tear propagation resistance | 50.1 KN/m |
| Shore hardness A | 93 |

EXAMPLE 16

15 parts of butane diol-(1,4), 5 parts of trimethylol propane and 22 parts of the polyether polyol having an average molecular weight of 552 described in Example 15 are vigorously mixed for 1.5 minutes at room temperature with 0.14 parts of the catalyst combination used in Example 7 and 140.2 parts of the prepolymer described in Example 1 (NCO:OH=1:1). The reactive mixture remains pourable for 4.5 minutes at 50° C. The cast object obtained is transparent and free from bubbles.

| Mechanical properties: | |
| --- | --- |
| Tensile strength | 35.8 MPa |
| Elongation at break | 532% |
| Tear propagation resistance | 49.4 KN/m |
| Shore hardness A | 91 |

EXAMPLE 17

Example 16 is repeated using 0.14 parts of the catalyst combination described in Example 10. The cast object obtained is transparent and free from bubbles.

EXAMPLE 18

15 parts of 1,4-butane diol, 5 parts of trimethylol propane and 80 parts of the polyester diol described in Example 1 are mixed at room temperature with 0.22 parts of the catalyst combination used in Example 7 and 94.32 parts of a semi-prepolymer having an isocyanate content of 23.6% of 1-isocyanato-3,3,5-trimethyl-5-isocyanatomethylcyclohexane and butane diol-(1,4) in the course of 1.5 minutes at 70° C. (sic) (NCO:OH=1:1). The reaction mixture remains pourable for 5 minutes at room temperature. The cast object, which may be removed from its mold after 9 minutes at 100° C., is transparent and free from bubbles. Shore hardness A: 98.

EXAMPLE 19

Example 18 is repeated, using 0.22 parts of the catalyst combination described in Example 10. A transparent elastomer which is free from bubbles and has a Shore hardness A of 98 is obtained.

EXAMPLE 20 (Comparison Experiment to Examples 18 and 19)

Example 18 is repeated using a catalyst combination of 0.11 parts of dibutyl tin dilaurate and 0.04 parts of triethylene diamine. A somewhat opaque elastomer permeated with bubbles is obtained which has a Shore hardness A of 98.

EXAMPLE 21

42 parts of the polyol mixture used in Example 15 are mixed for 1 minute at 50° C. with 0.11 parts of the catalyst combination used in Example 18 and 93.4 parts of the semi-prepolymer described in Example 18. The reaction mixture remains pourable for 6 minutes at 50° C. The cast object, which may be removed from the mold after 8 minutes at 100° C., is free from bubbles and transparent. Shore hardness A: 94.

EXAMPLE 22

95 parts of the polyol mixture used in Example 13 and 111.6 parts of the prepolymer used in Example 1 are mixed for 1.5 minutes at 50° C. with a catalyst combination of 0.05 parts of a 10% potassium or sodium hydroxide solution in butane diol-(1,4) and 0.06 parts of tin-bis-(octyl mercaptide). The reactive mixture remains pourable for 6 minutes at 50° C. The cast object, which may be removed from the mold after 10 minutes at 100° C., is transparent and free from bubbles. Shore hardness A: 90.

EXAMPLE 23

Example 21 is repeated using a catalyst combination of 0.05 parts of a 10% potassium or sodium hydroxide solution in butane diol-(1,4) and 0.06 parts of lead bis-(octyl mercaptide). The pot-life is 8.5 minutes. The cast object, which may be removed from its mold after 10 minutes at 100° C., is transparent and free from bubbles. Shore hardness A: 91.

EXAMPLE 24

Example 15 is repeated using 0.14 parts of the catalyst combination used in Example 21. A transparent elastomer free from bubbles is obtained. Shore hardness A: 97.

EXAMPLE 25

Example 17 is repeated using 0.22 parts of the catalyst combination used in Example 22. A transparent elastomer free from bubbles and having a Shore hardness A of 97 is obtained.

EXAMPLE 26

Example 18 is repeated using 0.22 parts of the catalyst combination described in Example 23. The polyurethane casting obtained is transparent and free from bubbles. Shore hardness A: 98.

What is claimed is:

1. In a process for the production of a light fast, transparent polyurethane elastomer comprising reacting:
   (A) from 90 to 50% by weight, based on the polyurethane solids content, of a compound having a molecular weight of from 400 to 10,000 which has at least two Zerewitinoff active hydrogen atoms;
   (B) from 50 to 10% by weight, based on the polyurethane solids content, of an aliphatic and/or alicyclic polyisocyanate; and
   (C) from 0 to 20% by weight, based on the polyurethane solids content, of a chain-lengthening agent having a molecular weight of from 60 to 400; in the presence of
   (D) catalysts for the isocyanate polyaddition reaction, the improvement wherein said catalysts, component (D), is a catalyst combination of:
   (a) an alkali metal hydroxide and/or alkaline earth metal hydroxide, and
   (b) a sulfur-containing organometallic compound corresponding to the formula:

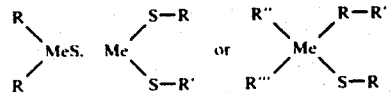

wherein
Me represents tin or lead;
R,R',R", and R"' which may be the same or different, each represents a straight- or branched chain alkyl group having from 1 to 20 carbon atoms or a cycloalkyl group having from 6 to 15 carbon atoms optionally substituted by $C_1$-$C_4$ alkyl groups or a phenyl group optionally substituted by $C_1$-$C_4$ alkyl groups or by halogen.

2. Process of claim 1, wherein said component (D) is used in a quantity of from 0.01 to 0.8% by weight, based on the polyurethane solids content.

3. In a process for the production of a light fast, transparent polyurethane elastomer comprising reacting:
   (A) from 90 to 50% by weight, based on the polyurethane solids content, of a compound having a molecular weight of from 400 to 10,000 which has at least two Zerewitinoff active hydrogen atoms;
   (B) from 50 to 10% by weight, based on the polyurethane solids content, of an aliphatic and/or alicyclic polyisocyanate; and
   (C) from 0 to 20% by weight, based on the polyurethane solids content, of a chain-lengthening agent having a molecular weight of from 60 to 400; in the presence of
   (D) catalysts for the isocyanate polyaddition reaction, the improvement wherein said catalysts, component (D), is a catalyst combination of:
   (a) an alkali metal hydroxide and/or alkaline earth metal hydroxide, and
   (b) a sulfur-containing organometallic compound corresponding to the formula:

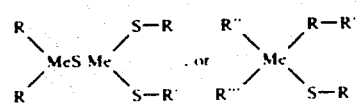

wherein
Me represents tin or lead;
R,R', R", and R"' which may be the same or different each represents a straight- or branched chain alkyl group having from 1 to 20 carbon atoms or a cycloalkyl group having from 6 to 15 carbon atoms optionally substituted by $C_1$-$C_4$ alkyl groups or a phenyl group optionally substituted by $C_1$-$C_4$ alkyl groups or by halogen
wherein the molar ratio of said alkali metal hydroxide and/or alkaline earth metal hydroxide to said organometallic compound is from 3:1 to 1:6.

4. Process of claim 3, wherein the molar ratio is from 1.5:1 to 1:3.

5. Process of claim 1, wherein said alkali metal hydroxide and/or alkaline earth metal hydroxide is used in the form of a from 1 to 20% by weight, solution in component (C).

6. The process of claim 1, wherein said alkali metal hydroxide and/or alkaline earth metal hydroxide is a hydroxide of lithium, sodium, potassium, magnesium and/or calcium.

* * * * *